United States Patent Office 2,965,641
Patented Dec. 20, 1960

2,965,641

DERIVATIVES OF 1-(2-AMINOETHYL)-5-ALKOXY-4-PYRIDONES

Carl Peter Krimmel, Mundelein, Ill., assignor to G. D. Searle & Co., Chicago, Ill., a corporation of Delaware No Drawing. Filed July 6, 1959, Ser. No. 824,938

12 Claims. (Cl. 260—247.5)

The present invention relates to a new group of derivatives of 1-(2-aminoethyl)-5-alkoxy-4-pyridones and particularly to the bases of the general structural formula

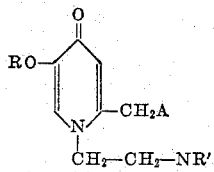

and their pharmaceutically acceptable non-toxic salts. In this structural formula A can be a halogen atom, a hydroxy group or an esterified hydroxy group. Thus A can be an acyl group derived from an alkanoic acid, but preferably from an aromatically substituted acid such as benzoic acid, hydroxybenzoic acid, methoxybenzoic acid, polymethoxybenzoic acid, phenylacetic acid, polyphenylacetic acid, polyphenylpropionic acid, polyphenylbutyric acid and the like.

In the foregoing formula, radical R represents a lower alkyl radical which is preferably methyl and ethyl but can also be a straight-chain or branched propyl, butyl, amyl, or hexyl radical.

The radicals R' and R" can represent lower alkyl groups as described above or the corresponding lower alkenyl radicals such as propenyl, butenyl, pentenyl, hexenyl, and the like. The radical NRR' can also represent a heterocyclic radical such as a pyrrolidino, dimethylpyrrolidino, piperidino, dimethylpiperidino, or morpholino radical.

The organic bases of this invention form pharmaceutically acceptable non-toxic salts with a variety of inorganic and strong organic acids including sulfuric, phosphoric, hydrochloric, hydrobromic, hydroiodic, sulfamic, citric, lactic, maleic, malic, succinic, tartaric, cinnamic, acetic, benzoic, gluconic, ascorbic and related acids.

The compounds of the foregoing structural formula wherein A is a hydroxy group can be prepared conveniently by heating the corresponding 2-hydroxymethyl-5-alkoxy-4-pyrone, a compound economically prepared from kojic acid, with an equivalent of a diamine of the structural formula

H₂N—CH₂—CH₂—NR'R"

The 1-(2-dialkylaminoethyl)-2-hydroxymethyl-5-alkoxy-4-pyridones and their cyclic analogs of this invention have valuable pharmacological properties. Thus they produce an ouabain-like stimulant effect on the out-put of the hypodynamic heart. They also inhibit the rate of hydrolysis of hyaluronic acid by hyaluronidase and are thus useful in inhibiting the spreading effect caused by hyaluronidase.

The 2-hydroxymethyl derivatives can be esterified by conventional means to prepare the 2-acyloxymethyl derivatives referred to hereinabove. These esters also have interesting pharmacological properties. Thus polyarylalkanoic acid esters such as the diphenylacetates produce a prolongation of the sleeping time produced by barbiturates. Also of special interest are the oxygenated benzoic acid esters such as the trimethoxybenzoates which are active as cardiac stimulants and as central nervous depressants, specifically as tranquilizers.

The 2-hydroxymethyl derivatives of this invention can be converted conveniently to the corresponding halomethyl derivatives by treatment with a thionyl halide. This reaction proceeds readily by adding thionyl halide to the dihydrohalide of the corresponding 2-hydroxymethyl compound. These 2-halomethyl derivatives of the formula

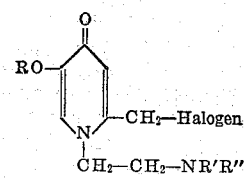

wherein R, R', R" are each lower alkyl radicals, have fungicidal action against organisms of the type of Trichophyton mentagrophytes. They are also valuable intermediates. Thus heating with an amine such as aminopentane yields 2,2-dialkyl-7-methoxy-8-oxo-1,2,3,4-tetrahydro-8H-pyrido[1.2]pyrazinium halides of the structural formula

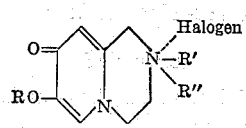

These quaternary salts are hyaluronidase inhibitors and have some ganglion-blocking activity. In addition they also have a fungicidal effect against organisms of the type of Trichophyton mentagrophytes.

Refluxing of a 1-(2-dialkylaminoethyl)-2-hydroxymethyl-5-alkoxy-4-pyridone in chloroform solution with thionyl chloride leads to the formation of a mixture of the dihydrochloride of the corresponding 1-(2-dialkylamino)-2-chloromethyl-5-alkoxy-4-pyridone and the hydrochloride of the corresponding 2,2-dialkyl-7-alkoxy-8-oxo-1,2,3,4-tetrahydro-8H-pyrido[1.2]pyrazinium halide.

The compounds which constitute this invention and methods for their preparation will appear more fully from the consideration of the following examples which are given for the purpose of illustration only and are not to be construed as limiting the invention in spirit or in scope.

Example 1

A mixture of 20.2 g. of 2-hydroxymethyl-5-methoxy-4-pyrone, 11.4 g. of 2-dimethylaminoethylamine, and 25 ml. of water is stirred and refluxed on the steam bath for 15 minutes. The reaction mixture is then vacuum distilled on the steam bath until no more water can be removed.

The residue is taken up in 500 ml. of hot butanone and treated with decolorizing carbon and anhydrous sodium sulfate. It is filtered, cooled in the ice bath, and crystallization is induced by scratching. Recrystallization from butanone gives a cream-colored, water-soluble, crystalline product melting at 134–137° C. The 1-(2-dimethylaminoethyl)-2-hydroxymethyl-5-methoxy-4-pyridone thus produced has the structural formula

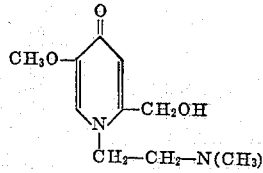

Substitution of 22.1 g. of 2-hydroxymethyl-5-ethoxy-4- pyrone in the foregoing procedure yields 1-(2-dimethylaminoethyl)-2-hydroxymethyl-5-ethoxy-4-pyridone as water soluble crystals.

*Example 2*

A mixture of 31.2 g. of 2-hydroxymethyl-5-methoxy-4-pyrone, 23.2 g. of 2-diethylaminoethylamine, and 40 ml. of water is stirred and refluxed on the steam bath for 20 minutes. The reaction mixture is stripped of water by vacuum distillation on the steam bath.

Several drops of the residue are dissolved in isopropanol, diluted with anhydrous ethyl ether and/or benzene and dried over calcium sulfate. Seed crystals are obtained by scratching and cooling in an ice-bath.

The main body of the residue is dissolved in 600 ml. of hot ethyl acetate, treated with decolorizing carbon, filtered, cooled, and seeded. The resultant solid is recrystallized from hot ethyl acetate to give water-soluble crystalline 1-(2-diethylaminoethyl)-2-hydroxymethyl-5-methoxy-4-pyridone melting at 90–93° C.

To a solution of 14.0 g. of 1-(2-diethylaminoethyl)-2-hydroxymethyl-5-methoxy-4-pyridone in 5 ml. of water is added 115 ml. of hydrogen chloride-isopropanol solution containing 4.0 g., of hydrogen chloride. Crystallization of this reaction mixture is induced by allowing it to cool, by scratching, or by evaporating a drop to dryness on the steam bath to obtain seeding material. Recrystallization from hot anhydrous isopropanol and drying in the steam cabinet gives white crystals of the dihydrochloride melting at about 182–185° C. to a clear liquid with gassing.

*Example 3*

A mixture of 12.5 g. of 2-hydroxymethyl-5-methoxy-4-pyrone, 12.6 g. of 2-diallylaminoethylamine, and 20 ml. of water is refluxed and stirred on the steam bath for 30 minutes. The reaction mixture is vacuum distilled on the steam bath until no more water can be removed.

The residue is dissolved in 100 ml. of anhydrous isopropanol and gradually diluted with 500 ml. of anhydrous ethyl ether. Crystallization can be conveniently induced by seeding with an analog such as 1-[2-(1-pyrrolidino)-ethyl]-2-hydroxymethyl-5-methoxy-4-pyridone.

Two recrystallizations from hot anhydrous benzene and activated carbon yield 1-(2-diallylaminoethyl)-2-hydroxymethyl-5-methoxy-4-pyridone as a white, water-soluble product melting at about 86–90° C.

By substitution of an equivalent amount of 2-dimethallylaminoethylamine as starting material there is obtained 1-(2-dimethallylaminoethyl)-2-hydroxymethyl-5-methoxy-4-pyridone of the formula

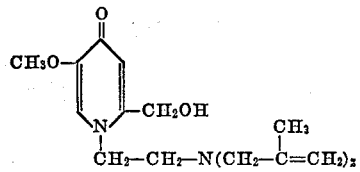

*Example 4*

A mixture of 25.0 g. of 2-hydroxymethyl-5-methoxy-4-pyrone, 19.4 g. of 1-(2-aminoethyl)pyrrolidine and 35 ml. of water is refluxed and stirred on the steam bath for 30 minutes. The water is then removed from the reaction mixture by vacuum distillation on the steam bath.

The orange-brown syrupy residue is taken up in 100 ml. of anhydrous ispropanol. Several drops of this isopropanol solution are worked with anhydrous ethyl ether to obtain seed crystals. The addition to the ether-isopropanol solution of a homolog such as 1-[2-(1-piperidino)ethyl]-2-hydroxymethyl-5-methoxy-4-pyridone can also be helpful in obtaining these seed crystals.

The isopropanol solution is gradually diluted with 500 ml. of anhydrous ethyl ether in the presence of the seed crystals. A light brown crystalline precipitate results.

It is filtered, ether washer, and air dried. It is recrystallized by dissolving in 200 ml. of hot anhydrous isopropanol, treating with activated carbon, filtering, and cooling. The cooled filtrate is mixed with 660 ml. of anhydrous ethyl ether after which the seed crystals are introduced. The resultant solid is filtered and dried in the steam cabinet. It is obtained as cream-colored water-soluble crystals melting at about 153–155° C. It is 1-[2-(1-pyrrolidino)ethyl]-2-hydroxymethyl-5-methoxy-4-pyridone and has the structural formula

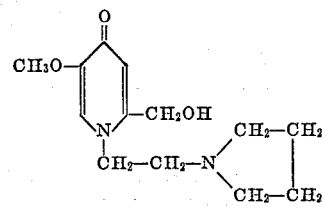

*Example 5*

A mixture of 31.2 g. of 2-hydroxymethyl-5-methoxy-4-pyrone, 26.0 g. of 4-(2-aminoethyl)morpholine, and 40 ml. of water is stirred and heated on the steam bath for 30 minutes. The clear brown reaction mixture is then vacuum-distilled on the steam bath until no more water can be removed.

The syrupy residue is dissolved in 150 ml. of anhydrous isopropanol. Several drops of this solution are worked with anhydrous ethyl ether or with a benzene-ether solution to obtain seed crystals.

In the presence of the seeds, the isopropanol solution is slowly diluted with 150 ml. of anhydrous ethyl ether. A light brown crystalline powder is obtained. Two recrystallizations from hot anhydrous isopropanol and decolorization with activated carbon give a white, water-soluble, basic, crystalline product melting at about 166–168° C. The 1-[2-(4-morpholino)ethyl]-2-hydroxymethyl-5-methoxy-4-pyridone thus produced has the structural formula

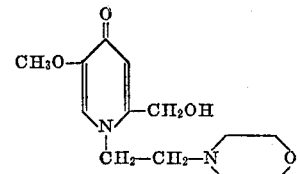

*Example 6*

A mixture of 25.0 g. of 2-hydroxymethyl-5-methoxy-4-pyrone, 21.8 g. of 1-(2-aminoethyl)piperidine, and 35 ml. of water is stirred and refluxed on the steam bath for 30 minutes. The reaction mixture is treated as in the preceding example to obtain 1-[2-(1-piperidino)-ethyl]-2-hydroxymethyl-5-methoxy-4-pyridone as a white, water-soluble, crystalline powder melting at about 138–140° C.

*Example 7*

To a refluxing, stirred solution of 20.3 g. of 1-(2-diethylaminoethyl)-2-hydroxymethyl-5-methoxy-4-pyridone in 280 ml. of anhydrous benzene is added 18.4 g. of diphenylacetyl chloride. The reaction mixture is refluxed for one hour during which time a layer of brown gum separates. The reaction mixture is cooled and the supernatant benzene is decanted.

The gum is taken up in 400 ml. of water and the slightly turbid water solution is clarified by extraction with ethyl ether. The clarified aqueous solution is treated with activated carbon and filtered. The filtrate is made alkaline with potassium carbonate and a brown oil is released. The oil solidifies upon standing and is filtered, water-washed, and dried in air. The solid is recrystallized by dissolving in 150 ml, of hot toluene, decolorizing with activated carbon, filtering, and concentrating to 50 ml. by vacuum distillation. This concentrate, being anhydrous, will show little tendency to crystallize upon cooling and seeding. However, if 3 ml. of water is added to the above solution, a crystalline slurry will develop at once. The slurry is suction-filtered and air-dried.

The above product is recrystallized by dissolving in 100 ml. of acetone at room temperature, decolorizing with activated carbon, filtering, and slowly diluting the filtrate with water. As soon as turbidity develops, the solution is seeded. The addition of water is then continued until a total of 300 ml. are added. The crystalline precipitate is filtered, washed with 100 ml. of water, and dried in a vacuum desiccator for two days. In this manner, the white crystalline diphenylacetate of 1-(2'-diethylaminoethyl)-2-hydroxymethyl-5-methoxy-4-pyridone is obtained as a hydrate containing one and one-half molecules of water. It melts at about 63–69° C.

The hydrate can be converted to the dihydrochloride by treating with a solution of hydrogen chloride in anhydrous isopropanol. Dilution with butanone precipitates a white, water-soluble dihydrochloride melting at about 120–125° C.

The basic diphenylacetate has the structural formula

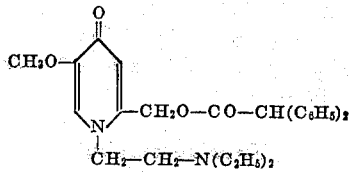

Example 8

To a solution of 5.1 g. of 1-(2-diethylaminoethyl)-2-hydroxymethyl-5-methoxy-4-pyridone in 70 ml. of anhydrous benzene is added 4.6 g. of 3,4,5-trimethoxy-benzoyl chloride. The mixture is refluxed on the steam bath for one hour. From the opaque purple reaction mixture, a lower layer of gum separates. This gum is taken up in 100 ml. of water and the benzene layer is separated from the water layer. The benzene layer contains the anhydride of 3,4,5-trimethoxybenzoic acid and is discarded. The water layer is made alkaline with potassium carbonate to release a dark brown oil. The oil is extracted with chloroform and the chloroform extract is dried over anhydrous potassium carbonate. The dried extract is stripped of chloroform on the steam bath under vacuum. The residue is taken up in 70 ml. of anhydrous benzene, treated with decolorizing carbon and filtered. The filtrate is concentrated under vacuum to approximately one-fifth of its volume, cooled in an ice-bath and seeded. The seeded solution sets to a solid which is placed on a suction filter and sucked free of solvent. The filter cake is washed with 2 ml. of cold ethyl acetate and recrystallized twice from anhydrous benzene to give a water-soluble product melting at about 116–119° C.

Seeds for this crystallization can be obtained by chromatography of the chloroform extract using a silica gel-ethanol-chloroform system.

The 3,4,5-trimethoxybenzoate of 1-(2-diethylaminoethyl)-2-hydroxymethyl-5-methoxy-4-pyridone obtained as above has the structural formula

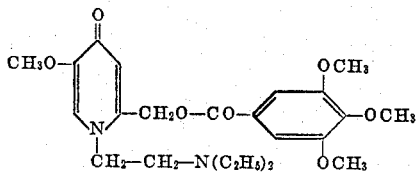

Example 9

To 4 g. of 1-(2-diethylaminoethyl)-2-hydroxymethyl-5-methoxy-4-pyridone dihydrochloride is added 15 ml. of thionyl chloride. An immediate reaction takes place with gas evolution. The clear yellow reaction mixture is diluted with 50 ml. of chloroform. An upper oily layer is formed. This is separated from the chloroform layer and taken up in 15 ml. of methanol. The methanol solution is diluted with 200 ml. of acetone and seeded with crystals previously obtained by working the reaction mixture with excess acetone. The product is filtered, washed with acetone and dried in the steam cabinet. This compound shows an indefinite melting point dependent upon evolution of hydrogen chloride and the manner of heating. The analysis for nitrogen, total chlorine and ionic chloride confirms that it is the dihydrochloride of 1-(2-diethylaminoethyl) - 2 - chloromethyl - 5 - methoxy - 4-pyridone. Substitution of 3.9 g. of 1-(2-dimethylaminoethyl)-2-hydroxymethyl-5-methoxy-4-pyridone as starting material yields 1-(2-dimethylaminoethyl)-2-chloromethyl-5-methoxy-4-pyridone.

Example 10

To a stirred solution of 50.0 g. of 1-(2-diethylaminoethyl)-2-hydroxymethyl-5-methoxy-4-pyridone in 200 ml. of chloroform, 75 g. of thionyl chloride is added. Addition is at such a rate as to initiate gentle reflux. Refluxing is continued for 10 minutes on the steam bath. During this operation, both an orange oily phase and a solid phase separate from the reaction mixture. The reaction mixture is cooled causing substantial solidification of the oil phase.

The solids are removed by suction filtration and the filter cake is washed by suspension in anhydrous ethyl ether. During each of these filtrations, the filter cake is exposed to atmospheric moisture as little as possible since it is hygroscopic under the conditions of the filtrations. The filter cake is dissolved in 200 ml. of warm methanol, treated with decolorizing carbon, filtered, and cooled.

The methanol solution is seeded with the solid previously obtained. It is then slowly diluted with 1800 ml. of acetone with stirring and gentle warming. Disregard for these conditions may cause setting to a stiff voluminous gel. Employment of these conditions should result in a crystalline solid which may be accompanied by partial gel formation. In this case, continued warming and scratching will convert the gel particles to a crystalline product which is suction filtered and dried in the steam cabinet. The 2,2-diethyl-7-methoxy-8-oxo-1,2,3,4-tetrahydro-8H-pyrido[1.2]pyrazinium chloride hydrochloride thus obtained melts at about 222–225° C. to a colorless frothy liquid. It has the structural formula

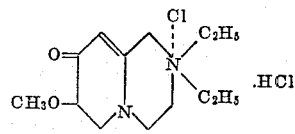

The acetone-methanol filtrate, obtained above, is concentrated to a viscous orange syrup by evaporation in the hood at room temperature. The syrup is treated with 100 ml. of acetone and stirred and scratched until it crystallizes. It is recrystallized by dissolving in 50 ml. of warm methanol, cooling, and slowly adding 500 ml. of acetone with stirring and seeding. The crystalline product is filtered and dried in the steam cabinet. It is 1 - (2 - diethylaminoethyl) - 2 - chloromethyl - 5 - methoxy-4-pyridone dihydrochloride. It is identical to the product of the preceding example.

Example 11

To a stirred suspension of 0.70 g. of 1-(2-diethylaminoethyl) - 2 - chloroethyl - 5 - methoxy - 4 - pyridone dihydrochloride in 10 ml. of absolute ethanol is added 0.70 g. of 1-aminopentane. The reaction mixture is refluxed one hour. The clear solution thus obtained is diluted with 10 ml. of anhydrous ethyl ether. A white precipitate is formed. It is suction filtered, washed with cold absolute ethanol, and dried in the steam cabinet. The white water-soluble crystals of 2,2-diethyl-7-methoxy - 8 - oxo - 1,2,3,4 - tetrahydro - 8H - pyrido[1.2]

pyrazinium chloride melt at about 255–257° C. with decomposition to a frothy red liquid.

A particularly convenient synthesis of the above quaternary salt can also be effected by directly treating the unseparated products of the preceding example with 1-aminopentane, for either product, treated with 1-aminopentane, yields this salt. If desired, the hydrochloride of 2,2 - diethyl - 7 - methoxy - 8 - oxo - 1,2,3,4 - tetrahydro-8H-pyrido[1.2]pyrazinium chloride may be reconstituted by treatment with hydrogen chloride in alcohol-acetone solution.

What is claimed is:

1. A compound of the structural formula

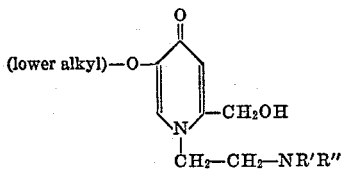

wherein NR'R" is a member of the class consisting of di-(lower)alkylamino, di-(lower)alkenylamino, morpholino, pyrrolidino and piperidino radicals.

2. A compound of the structural formula

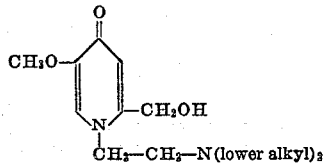

3. 1 - (2 - dimethyldiaminoethyl) - 2 - hydroxymethyl-5-methoxy-4-pyridone.

4. 1 - (2 - diethylaminoethyl) - 2 - hydroxymethyl-5-methoxy-4-pyridone.

5. 1 - (2 - diallylaminoethyl) - 2 - hydroxymethyl-5-methoxy-4-pyridone.

6. 1 - [2 - (1 - pyrrolidino)ethyl] - 2 - hydroxymethyl-5-methoxy-4-pyridone.

7. 1 - [2 - (1 - piperidino)ethyl] - 2 - hydroxymethyl-5-methoxy-4-pyridone.

8. 1 - [2 - (4 - morpholino)ethyl] - 2 - hydroxymethyl-5-methoxy-4-pyridone.

9. 1 - (2 - diethylaminoethyl) - 2 - hydroxymethyl-5-methoxy-4-pyridone diphenylacetate.

10. 1 - (2 - diethylaminoethyl) - 2 - hydroxymethyl-5-methoxy-4-pyridone 3,4,5-trimethoxybenzoate.

11. A compound of the structural formula

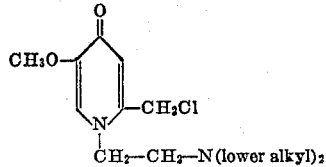

12. 1 - (2 - diethylaminoethyl) - 2 - chloromethyl-5-methoxy-4-pyridone.

No references cited.